(12) United States Patent
Seki

(10) Patent No.: US 11,987,959 B2
(45) Date of Patent: May 21, 2024

(54) SHOVEL

(71) Applicant: SUMITOMO CONSTRUCTION MACHINERY CO., LTD., Tokyo (JP)

(72) Inventor: Takuma Seki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 598 days.

(21) Appl. No.: 17/158,268

(22) Filed: Jan. 26, 2021

(65) Prior Publication Data

US 2021/0148088 A1 May 20, 2021

Related U.S. Application Data

(63) Continuation of application No. PCT/JP2019/029849, filed on Jul. 30, 2019.

(30) Foreign Application Priority Data

Jul. 31, 2018 (JP) ................. 2018-144608

(51) Int. Cl.
*E02F 9/26* (2006.01)
*B60R 1/23* (2022.01)
(Continued)

(52) U.S. Cl.
CPC .................. *E02F 9/26* (2013.01); *B60R 1/23* (2022.01); *G06T 5/80* (2024.01); *H04N 7/181* (2013.01);
(Continued)

(58) Field of Classification Search
CPC . B60R 1/00; B60R 2300/105; B60R 2300/30; B60R 2300/802;
(Continued)

(56) References Cited

U.S. PATENT DOCUMENTS 6,549,139 B2 * 4/2003 Shaw, Jr. ................ B66C 13/46
340/685
7,317,813 B2 * 1/2008 Yanagawa ................ G06T 3/00
348/148
(Continued)

FOREIGN PATENT DOCUMENTS

EP 2003018 12/2008
EP 2560385 2/2013
(Continued)

OTHER PUBLICATIONS

English Translation with Original Doc WO 2020027139, SEKI, Takuma, filed Jul. 30, 2019 (Year: 2019).*
(Continued)

*Primary Examiner* — Paul N Dickson
*Assistant Examiner* — Caitlin Anne Miller
(74) *Attorney, Agent, or Firm* — IPUSA, PLLC

(57) ABSTRACT

A shovel includes a lower traveling structure, an upper swing structure mounted on the lower traveling structure via a swing mechanism, an image capturing device attached to the upper swing structure to capture an image of an area surrounding the upper swing structure, and a display device. The display device is configured to display the image captured by the image capturing device such that distortion in a part of an edge of the upper surface of the upper swing structure is reduced compared with distortion in another part in the image.

12 Claims, 15 Drawing Sheets

(51) Int. Cl.
  *E02F 3/32* (2006.01)
  *E02F 9/16* (2006.01)
  *E02F 9/22* (2006.01)
  *G06T 5/80* (2024.01)
  *H04N 7/18* (2006.01)
  *H04N 23/90* (2023.01)

(52) U.S. Cl.
  CPC ........ *H04N 23/90* (2023.01); *B60R 2300/105* (2013.01); *B60R 2300/30* (2013.01); *E02F 3/32* (2013.01); *E02F 9/16* (2013.01); *E02F 9/2225* (2013.01); *E02F 9/2285* (2013.01); *E02F 9/2292* (2013.01); *E02F 9/2296* (2013.01); *G06T 2207/30252* (2013.01)

(58) Field of Classification Search
  CPC ...... B60R 2300/8093; B60R 2300/301; B60R 2300/607; B60R 2300/307; B60R 2001/1253; B60R 21/01538; E02F 9/26; G06T 5/00; H04N 7/181; H04N 23/90
  See application file for complete search history.

(56) References Cited

U.S. PATENT DOCUMENTS

| | | | | |
|---|---|---|---|---|
| 7,728,879 B2* | 6/2010 | Ishii | ................ | G06V 20/56 348/148 |
| 10,867,377 B2* | 12/2020 | Asada | ................ | G01N 33/24 |
| 11,370,360 B2* | 6/2022 | Imamura | ................ | B60R 1/08 |
| 11,434,623 B2* | 9/2022 | Hayakawa | ................ | G06T 7/73 |
| 11,492,782 B2* | 11/2022 | Seki | ................ | B60R 1/00 |
| 11,634,890 B2* | 4/2023 | Tanimoto | ................ | E02F 9/264 701/34.2 |
| 2008/0309784 A1* | 12/2008 | Asari | ................ | B60R 1/00 348/222.1 |
| 2013/0222573 A1* | 8/2013 | Onuma | ................ | G05B 9/02 348/82 |
| 2014/0354813 A1* | 12/2014 | Ishimoto | ................ | E02F 9/24 348/148 |
| 2014/0362220 A1* | 12/2014 | Izumikawa | ................ | G01S 17/89 348/148 |
| 2016/0005286 A1* | 1/2016 | Kiyota | ................ | E02F 9/262 340/435 |
| 2016/0024758 A1* | 1/2016 | Ishimoto | ................ | B60K 35/00 348/139 |
| 2021/0010243 A1* | 1/2021 | Fukuoka | ................ | B60Q 5/006 |

FOREIGN PATENT DOCUMENTS

| | | | |
|---|---|---|---|
| JP | 2009-113561 | 5/2009 | |
| JP | 2011-179279 | 9/2011 | |
| JP | 2012-172350 | 9/2012 | |
| JP | 2014-183497 | 9/2014 | |
| JP | 2015-184903 | 10/2015 | |
| JP | 2016-013887 | 1/2016 | |
| JP | 2017-147759 | 8/2017 | |
| JP | 2018-036937 | 3/2018 | |
| WO | WO-2020027139 A1 * | 2/2020 | ............... B60R 1/00 |

OTHER PUBLICATIONS

International Search Report for PCT/JP2019/029849 dated Oct. 15, 2019.

* cited by examiner

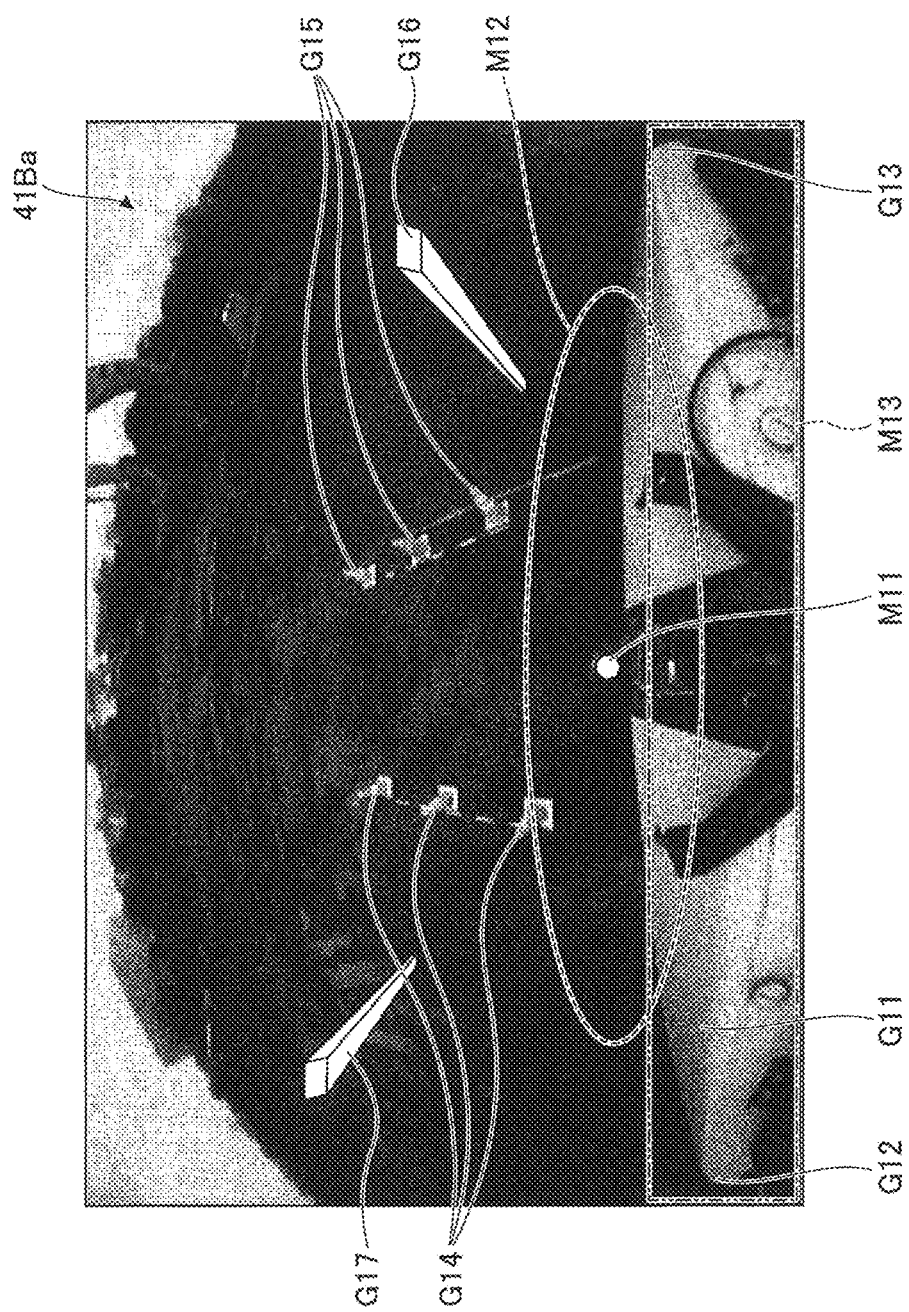

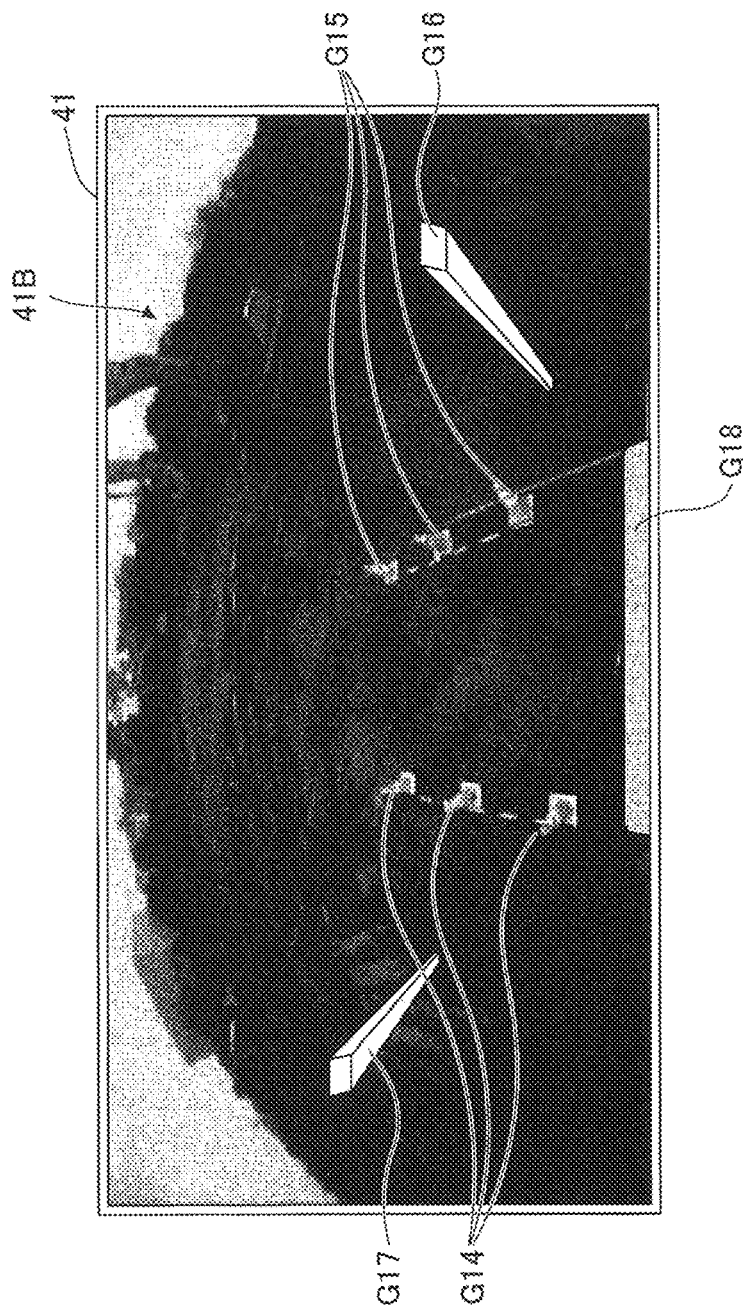

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/029849, filed on Jul. 30, 2019 and designating the U.S., which claims priority to Japanese patent application No. 2018-144608, filed on Jul. 31, 2018. The entire contents of the foregoing applications are incorporated herein by reference.

BACKGROUND

Technical Field

The present disclosure relates to shovels.

Description of Related Art

A shovel equipped with a back camera has been known. This back camera is attached to an upper surface of the upper swing structure such that an image of an edge of the counterweight is included in a lower end portion of an image captured by the back camera. Normally, an image of the ground behind the shovel is on top of the counterweight edge image in the back camera-captured image.

SUMMARY

According to an aspect of the present invention, a shovel includes a lower traveling structure, an upper swing structure mounted on the lower traveling structure via a swing mechanism, an image capturing device attached to the upper swing structure to capture an image of an area surrounding the upper swing structure, and a display device. The display device is configured to display the image captured by the image capturing device such that distortion in a part of an edge of the upper surface of the upper swing structure is reduced compared with distortion in another part in the image.

BRIEF DESCRIPTION OF THE DRAWINGS

FIG. 5A illustrates an example of an image captured by a back camera;
FIG. 5B illustrates an example of the display of the back camera image.

DETAILED DESCRIPTION

Figure 1:
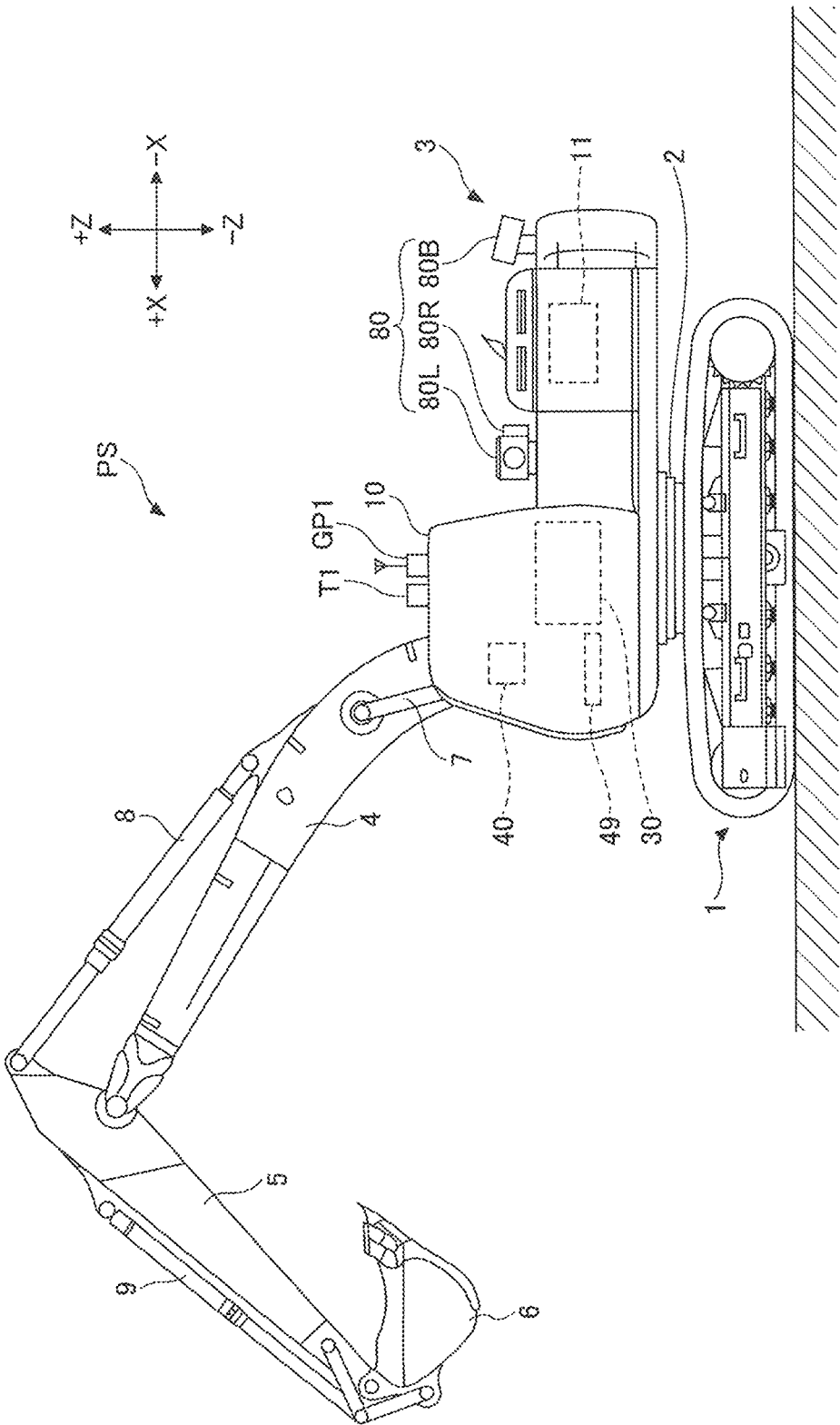
FIG. 1 is a side view of a shovel according to an embodiment of the present invention.

According to the related-art shovel, an operator who looks at the back camera-captured image may feel a difficulty in understanding the relationship between a feature such as a cliff, a pit, an obstacle or the like behind the shovel and the width of the shovel when moving the shovel backward. This is because the counterweight edge image lies over the entire width of the back camera-captured image. In other words, this is because no image of the left end or the right end of the counterweight is included in the back camera-captured image.

Therefore, it is desired to provide a shovel that can make it easier for an operator to understand the relationship between a feature present around the shovel and the width of the shovel.

According to an aspect of the present invention, a shovel that can make it easier for an operator to understand the relationship between a feature present around the shovel and the width of the shovel is provided.

A shovel according to embodiments of the present invention is described with reference to the drawings. In the drawings, the same components are given the same reference numerals, and a duplicate description thereof may be omitted.

FIG. 1 is a side view of a shovel PS serving as an excavator according to an embodiment of the present invention. An upper swing structure 3 is mounted on a lower traveling structure 1 of the shovel PS via a swing mechanism 2. A boom 4 is attached to the upper swing structure 3. An arm 5 is attached to the distal end of the boom 4. A bucket 6 serving as an end attachment is attached to the distal end of the arm 5.

The boom 4, the arm 5, and the bucket 6 constitute an excavation attachment that is an example of an attachment. The boom 4 is driven by a boom cylinder 7. The arm 5 is driven by an arm cylinder 8. The bucket 6 is driven by a bucket cylinder 9.

A power source such as an engine 11 is mounted on and an image capturing device 80 is attached to the upper swing structure 3. The image capturing device 80 includes side cameras that capture an image of a space to the side of the shovel PS and a back camera 80B that captures an image of a space behind the shovel PS. The side cameras include a left camera 80L that captures an image of a space to the left of the shovel PS and a right camera 80R that captures an image of a space to the right of the shovel PS. Each of the left camera 80L, the right camera 80R, and the back camera 80B is, for example, a digital camera including an imaging device such as a CCD or a CMOS, and transmits a captured image to a display device 40 installed in a cab 10. The image capturing device 80 may also be a stereo camera, a LIDAR, or the like. According to this embodiment, each of the left camera 80L, the right camera 80R, and the back camera 80B is a digital camera including a wide-angle lens having a horizontal angle of view of 160 degrees.

The cab 10 is provided on the left front of the upper swing structure 3. A controller 30, the display device 40, a gate lock lever 49, etc., are installed in the cab 10. A GPS device (GLASS receiver) GP1 and a communications device T1 are attached to the cab 10. The GPS device GP1 is configured to detect the position of the shovel PS and feed data on the detected position to the controller 30. The communications device T1 is configured to control communications with the outside and feed data obtained from the outside to the controller 30.

The controller 30 is configured to operate as a main control part to control the driving of the shovel PS. According to this embodiment, the controller 30 is constituted of a processor unit including a CPU and an internal memory. The CPU executes programs stored in the internal memory to implement various functions of the controller 30.

The display device 40 is configured to display an image containing various kinds of work information in response to a command from the controller 30.

The gate lock lever 49 is a mechanism to prevent the shovel PS from being accidentally operated, and is provided between the door and the operator seat of the cab 10. The gate lock lever 49 enables an operating device 26 (see FIG. 2) in response to being pulled up to prevent an operator from exiting the cab 10, and disables the operating device 26 in response to being pushed down to allow the operator to exit the cab 10.

Figure 2:
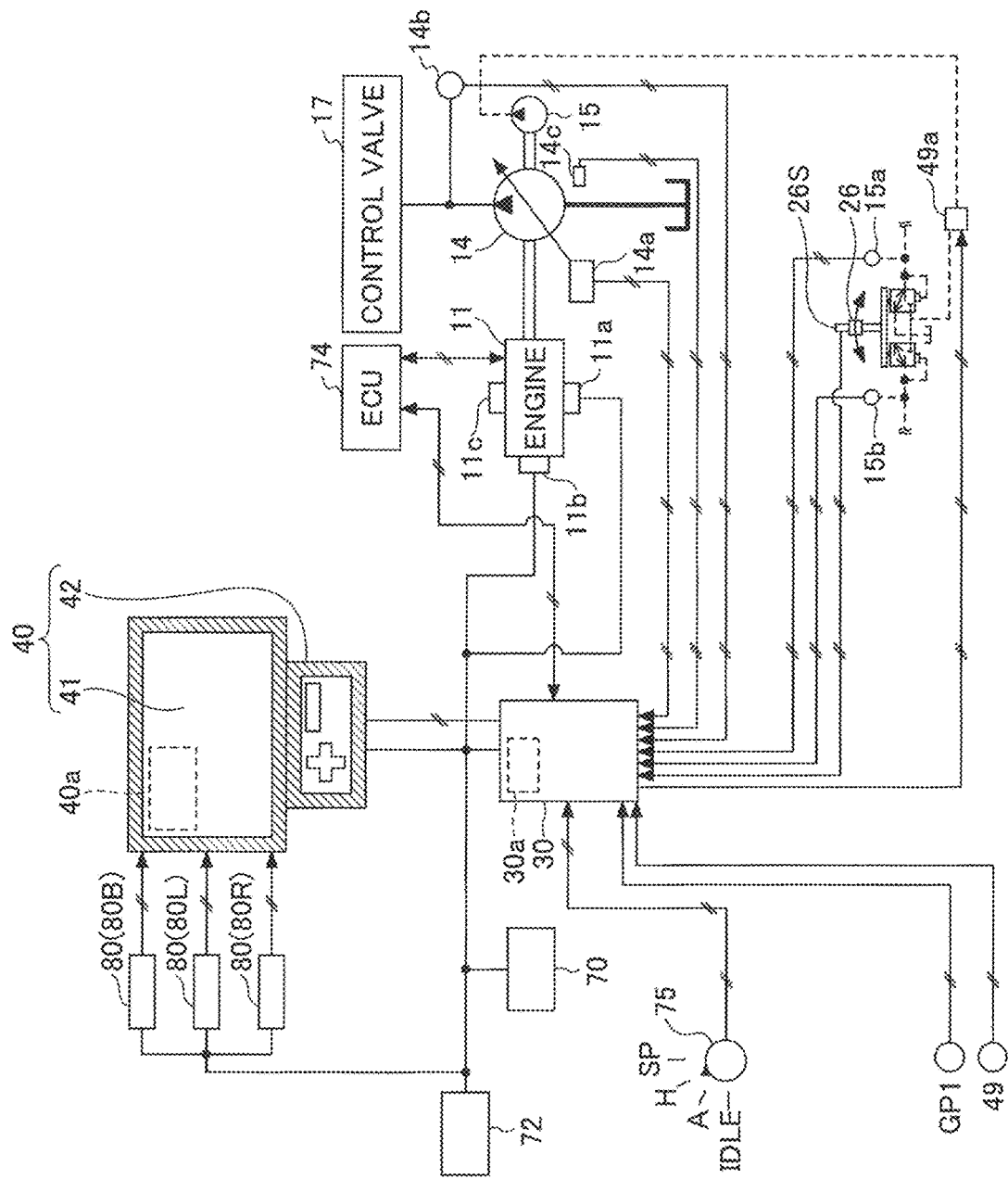
FIG. 2 is a system configuration diagram of the shovel of FIG. 1.

FIG. 2 is a diagram illustrating a system configuration of the shovel PS. The display device 40 displays an image containing work information, etc. The display device 40 is connected to the controller 30 via, for example, a communications network such as a CAN or a LIN, a dedicated line, or the like.

The display device 40 includes a conversion part 40a that generates an image to be displayed on an image display part 41. The conversion part 40a is configured to, for example, generate an image including a captured image to be displayed on the image display part 41 based on image data obtained from the image capturing device 80. Image data are input from each of the left camera 80L, the right camera 80R, and the back camera 80B to the display device 40.

According to this embodiment, the conversion part 40a is configured to convert data to be displayed on the image display part 41 among various kinds of data input from the controller 30 to the display device 40 into an image signal. Example of data input from the controller 30 to the display device 40 include data indicating the temperature of engine coolant water, data indicating the temperature of hydraulic oil, data indicating the amount of a remaining aqueous urea solution, and data indicating the amount of remaining fuel.

According to this embodiment, the conversion part 40a is configured to output an image signal obtained by conversion to the image display part 41 to display a captured image or an image generated based on various kinds of data on the image display part 41. The conversion part 40a may be provided in, for example, the controller 30 instead of the display device 40. In this case, the image capturing device 80 is connected to the controller 30.

According to this embodiment, the display device 40 includes an input device 42. The input device 42 is a device for an operator of the shovel PS inputting various kinds of information to the controller 30, the display device 40, or the like. According to the example of FIG. 2, the input device 42 is a push-button switch provided on a switch panel. The input device 42 may also be, for example, a membrane switch or a touchscreen.

The display device 40 is configured to receive a supply of electric power from a rechargeable battery 70 to operate. The rechargeable battery 70 is charged with electric power generated by an alternator 11a (generator) of the engine 11, for example. According to this embodiment, the electric power of the rechargeable battery 70 is also supplied to electrical equipment 72 of the shovel PS other than the controller 30 and the display device 40. A starter 11b of the engine 11 is configured to be driven with electric power from the rechargeable battery 70 to start the engine 11.

According to this embodiment, the engine 11 is controlled by an engine controller 74. The rotating shaft of the engine 11 is connected to the rotating shaft of each of a main pump 14 and a pilot pump 15. The engine controller 74 transmits various data showing the condition of the engine 11 (for example, data showing coolant water temperature detected at a water temperature sensor 11c) to the controller 30. The controller 30 stores these data in a storage part 30a and transmits these data to the display device 40 on an as-needed basis.

The main pump 14 is a hydraulic pump for supplying hydraulic oil to a control valve unit 17 via a hydraulic oil line. The main pump 14 is, for example, a swash plate variable displacement hydraulic pump.

The pilot pump 15 is a hydraulic pump for supplying hydraulic oil to various hydraulic control devices via a pilot line. The pilot pump 15 is, for example, a fixed displacement hydraulic pump. The pilot pump 15, however, may be omitted. In this case, the function carried by the pilot pump 15 may be implemented by the main pump 14. That is, the main pump 14 may have the function of supplying hydraulic oil to the operating device 26, etc., after reducing the pressure of the hydraulic oil with a throttle or the like, apart from the function of supplying hydraulic oil to the control valve unit 17.

The control valve unit 17 is a hydraulic control device that controls a hydraulic system in the shovel PS, and includes multiple flow control valves. The control valve unit 17 is configured to selectively supply hydraulic oil discharged by the main pump 14 to one or more hydraulic actuators, for example. Examples of hydraulic actuators include the boom cylinder 7, the arm cylinder 8, the bucket cylinder 9, travel hydraulic motors, and a swing hydraulic motor.

The operating device 26 is a device that the operator uses to operate the hydraulic actuators, and is provided in the cab 10. The operating device 26 is operated to cause hydraulic oil to be supplied from the pilot pump 15 to a pilot port of a corresponding flow control valve. The hydraulic oil supplied to the pilot port is commensurate with the operation details of the operating device 26. Examples of operation details include the direction of operation and the amount of operation.

The controller 30 is configured to control the operation of the shovel PS. The controller 30 closes a gate lock valve 49a when the gate lock lever 49 is pushed down, and opens the gate lock valve 49a when the gate lock lever 49 is pulled up. The gate lock valve 49a is a selector valve provided in an oil conduit between the control valve unit 17 and the operating device 26. The gate lock valve 49a opens or closes in response to a command from the controller 30. The gate lock valve 49a, however, may be mechanically connected to the gate lock lever 49 to open or close in response to the operation of the gate lock lever 49.

The gate lock valve 49a is closed to interrupt a flow of hydraulic oil between the control valve unit 17 and the operating device 26 to disable the operating device 26. That is, the gate lock valve 49a is closed to prevent the hydraulic actuators from being operated through operations of the operating device 26. Furthermore, the gate lock valve 49a is open to let hydraulic oil flow between the control valve unit 17 and the operating device 26 to enable the operating device 26. That is, the gate lock valve 49a is open to allow the hydraulic actuators to be operated through operations of the operating device 26.

With the gate lock valve 49a being open to enable the operating device 26, the controller 30 detects the operation details of the operating device 26 based on a pilot pressure detected with a pressure sensor 15a or 15b.

Furthermore, the controller 30 obtains, for example, various data as described below. The data obtained by the controller 30 are stored in the storage part 30a.

A regulator 14a of the main pump 14 outputs data showing a swash plate angle to the controller 30. A discharge pressure sensor 14b outputs data showing the discharge pressure of the main pump 14 to the controller 30. An oil temperature sensor 14c provided in a conduit between a hydraulic oil tank and the main pump 14 outputs data showing the temperature of hydraulic oil flowing through the conduit to the controller 30. The pressure sensors 15a and 15b detect a pilot pressure generated when the operating device 26 is operated, and output data showing the detected pilot pressure to the controller 30.

An operating lever serving as the operating device 26 is provided with a switch button 26S that is another example of the input device 42. By operating the switch button 26S while operating the operating lever, the operator can output a command signal to the controller 30.

An engine rotational speed adjustment dial 75 is provided in the cab 10 of the shovel PS. The engine rotational speed adjustment dial 75 is a dial for adjusting the rotational speed of the engine 11. According to this embodiment, the engine rotational speed adjustment dial 75 is configured to be able to select the engine rotational speed from among the four levels of SP mode, H mode, A mode, and idling mode. The engine rotational speed adjustment dial 75 outputs data showing the setting of the engine rotational speed to the controller 30. FIG. 2 illustrates that the H mode is selected with the engine rotational speed adjustment dial 75.

The SP mode is a rotational speed mode selected when it is desired to prioritize workload, and typically uses the highest engine rotational speed. The H mode is a rotational speed mode selected when it is desired to satisfy both workload and fuel efficiency, and typically uses the second highest engine rotational speed. The A mode is a rotational speed mode selected when it is desired to operate the shovel PS with low noise while prioritizing fuel efficiency, and typically uses the third highest engine rotational speed. The idling mode is a rotational speed mode selected when it is desired to idle the engine 11, and typically uses the lowest engine rotational speed. According to this embodiment, the engine 11 is controlled to maintain an engine rotational speed corresponding to a rotational speed mode set with the engine rotational speed adjustment dial 75.

Figure 3A:
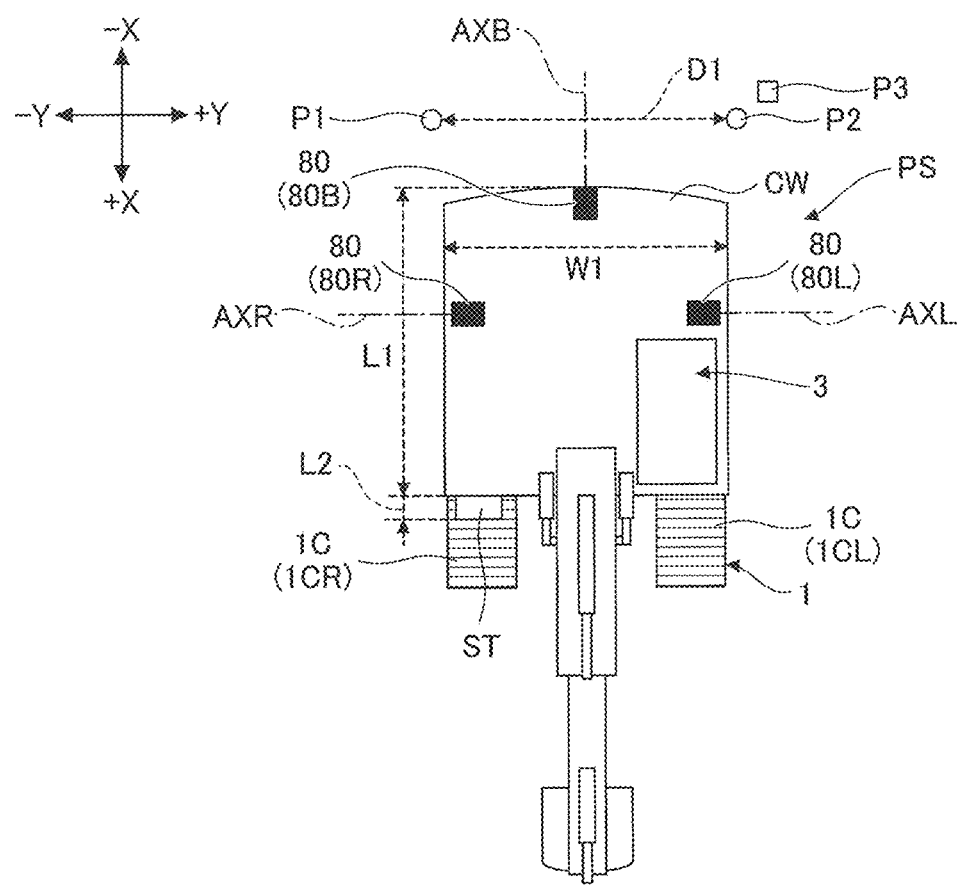
FIG. 3A is a plan view of the shovel of FIG. 1.
Figure 3B:
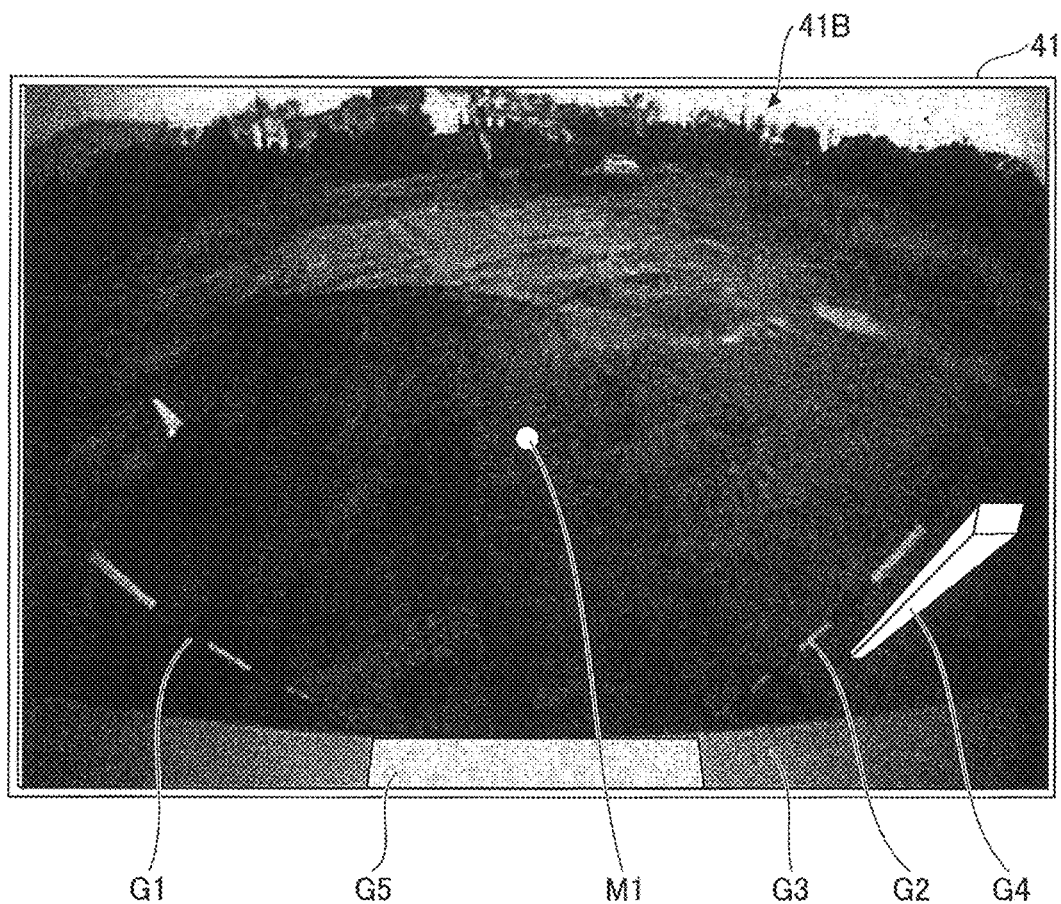
FIG. 3B illustrates an example of the display of a back camera image.

Next, an image displayed on the image display part 41 of the display device 40 is described with reference to FIGS. 3A and 3B. FIG. 3A is a plan view of the shovel PS. FIG. 3B illustrates an example of the display of a back camera image 41B. The back camera image 41B, which is an image generated and displayed based on an image captured by the back camera 80B, includes a first pole image G1, a second pole image G2, a counterweight image G3, a stake image G4, and a counterweight figure G5. An optical axis point M1 of the back camera image 41B is a pixel corresponding to the intersection of an optical axis AXB of the back camera 80B and a feature that is an object of imaging. The optical axis AXB of the back camera 80B is a virtual straight line that passes through the center and the focal point of the lenses of the back camera 80B. The same is true for an optical axis AXL of the left camera 80L and an optical axis AXR of the right camera 80R. The feature that is an object of imaging, which is the ground in this example, may also be a person, an animal, a machine, a building, or the like. While represented by a circular mark in FIG. 3B, the optical axis point M1 is not actually displayed on the back camera image 41B.

As illustrated in FIG. 3A, the shovel PS is in a state where the longitudinal axis of the lower traveling structure 1 and the longitudinal axis of the upper swing structure 3 are parallel. That is, the shovel PS is in a state where a direction in which the excavation attachment lies is parallel to a direction in which each of a left crawler 1CL and a right crawler 1CR lies.

The first pole image G1 is an image of a first pole P1 fixed on the ground, and the second pole image G2 is an image of a second pole P2 fixed on the ground. The first pole P1 is fixed on the outer side (−Y side) of a position where the outer edge of the right crawler 1CR passes when the shovel PS travels backward. The second pole P2 is fixed on the outer side (+Y side) of a position where the outer edge of the left crawler 1CL passes when the shovel PS travels backward. That is, a distance D1 between the first pole P1 and the second pole P2 corresponds to a width slightly greater than a width W1 of the shovel PS (a counterweight CW).

The counterweight image G3 is an image of a back side (−X side) edge of the upper surface of the counterweight CW attached to the back end of the upper swing structure 3.

The stake image G4 is an image of a stake P3 driven into the ground. The stake P3 is on the +Y side relative to the second pole P2. Specifically, the stake P3 is so positioned as not to contact the shovel PS even when the shovel PS travels backward.

The counterweight figure G5 is a figure showing the size of the width W1 of the upper swing structure 3. According to the example of FIGS. 3A and 3B, the counterweight figure G5 is a substantially rectangular computer-generated graphic (figure) having a width that is the width W1 of the counterweight CW projected onto a predetermined virtual plane, and is superimposed and displayed over the counterweight image G3. According to this embodiment, the counterweight figure G5 is drawn based on the position and the pose of the back camera 80B attached to the upper swing structure 3, the camera parameters of the back camera 80B, etc. The predetermined virtual plane is, for example, a virtual plane corresponding to the ground on which the shovel PS is positioned. The virtual plane corresponding to the ground on which the shovel PS is positioned may be a virtual horizontal plane or a virtual inclined plane. In this case, in the back camera image 41B, the width of the counterweight figure G5 is smaller than the width of the counterweight image G3. This is because the virtual plane corresponding to the ground on which the shovel PS is positioned is at a lower position, that is, a position farther from the back camera 80B, than a virtual plane corresponding to the upper surface of the counterweight CW. The predetermined virtual plane, however, may also be a virtual plane at a position higher than the virtual plane corresponding to the ground on which the shovel PS is positioned or a virtual plane at a position lower than the virtual plane corresponding to the ground on which the shovel PS is positioned. The counterweight figure G5 may be drawn in a layer different from a layer in which a back camera image is drawn and be superimposed on the back camera image when displayed, for example.

Ii is assumed that the operator looks at a back camera image that does not include the counterweight figure G5. In this case, the operator may wrongly understand that the counterweight CW will contact the stake P3 when moving the shovel PS backward. This is because the counterweight image G3 is displayed over the entire width of the back camera image at its lower end.

In contrast, the conversion part 40a of the display device 40 displays the counterweight figure G5 in such a manner that the positional relationship between the machine body width of a shovel and a feature in the back camera image 41B is equal to their actual positional relationship. That "the positional relationship between the machine body width of a shovel and a feature in the back camera image 41B is equal to their actual positional relationship" means that an apparent positional relationship in the back camera image 41B is consistent with an actual positional relationship. According to the example illustrated in FIG. 3B, the conversion part 40a displays the counterweight figure G5 such that the width of the counterweight figure G5 appears to be slightly smaller than the interval between the first pole image G1 and the second pole image G2. This is because the actual width W1 of the counterweight CW, namely, the width of crawlers 1C, is slightly smaller than the interval between the first pole P1 and the second pole P2. Therefore, the display device 40 can make the operator of the shovel PS understand that the counterweight CW does not contact the stake P3 even when the shovel PS travels backward. This is because in the back camera image 41B, the right end of the counterweight figure G5 is positioned on the left side of the stake image G4 in the width direction of the back camera image 41B. The conversion part 40a does not have to display the counterweight figure G5 such that the positional relationship between the machine body width of a shovel and a feature in the back camera image 41B is exactly equal to their actual positional relationship. For example, the scale of the counterweight figure G5 does not necessarily have to be accurate.

The conversion part 40a of the display device 40 may make the counterweight image G3 inconspicuous to highlight the counterweight figure G5. The conversion part 40a may reduce the luminance of the counterweight image G3, for example. The conversion part 40a may perform trimming, masking, or the like on the counterweight image G3.

Processing such as displaying, trimming, or masking of the counterweight figure G5 may be performed by the controller 30 or by a processor unit installed in the image capturing device 80 (the back camera 80B).

According to this configuration, the shovel PS can make it easier for the operator to understand the relationship between a feature present around the shovel PS and the width W1 of the shovel PS.

Figure 4A:
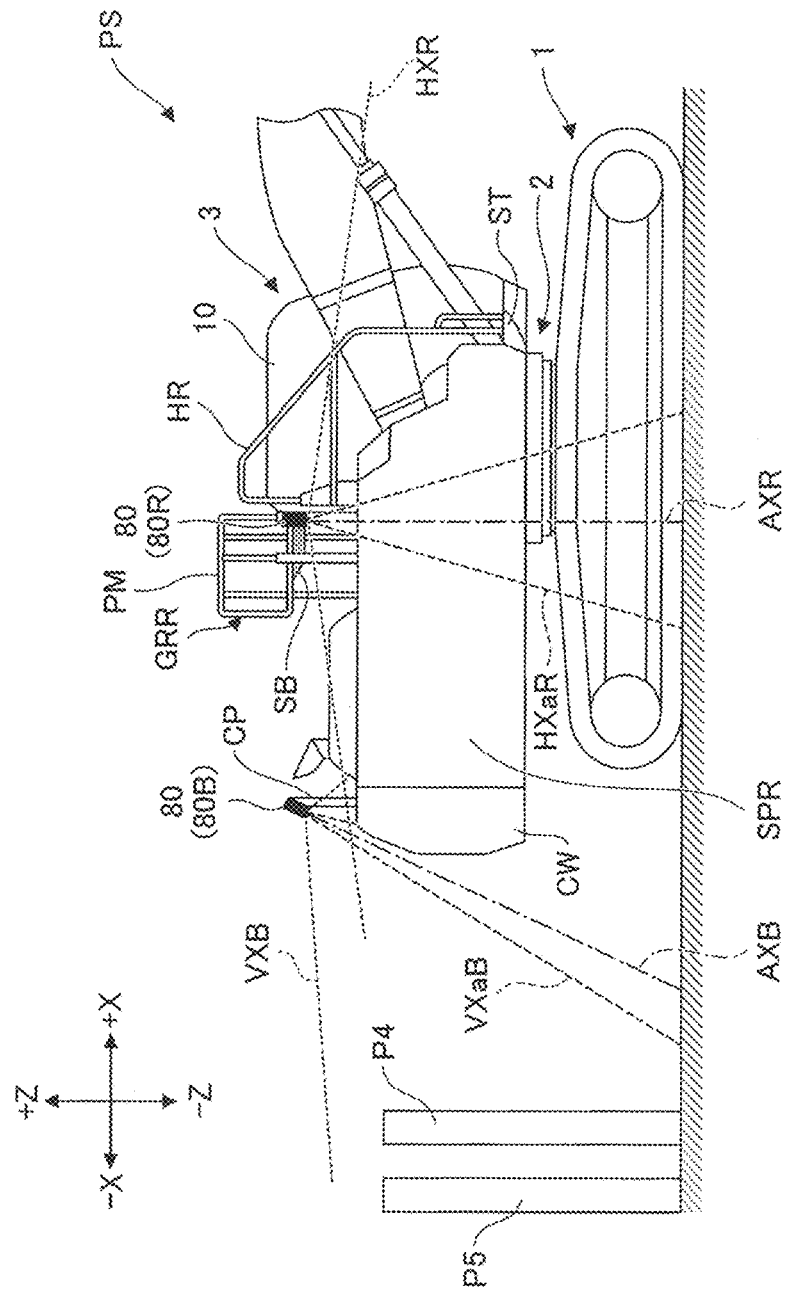
FIG. 4A is a right side view of the shovel, illustrating an example of the installation of an image capturing device.
Figure 4B:
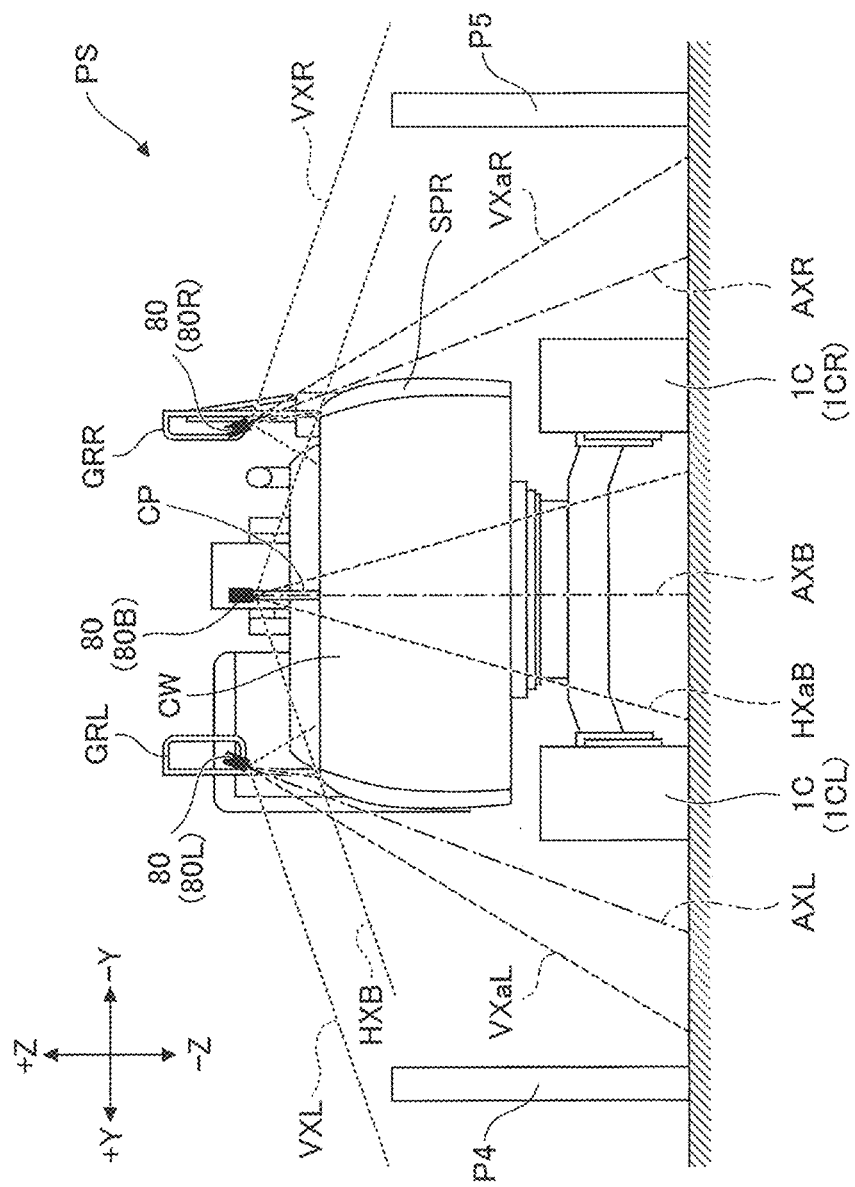
FIG. 4B is a rear view of the shovel, illustrating the example of the installation of the image capturing device.

Next, another example of the display of the back camera image 41B is described with reference to FIGS. 4A, 4B, 5A and 5B. FIG. 4A is a right side view of the shovel PS. FIG. 4B is a rear view of the shovel PS.

According to this example, the back camera 80B is attached to a bracket CP that extends in the +Z direction from the upper surface of the counterweight CW as illustrated in FIGS. 4A and 4B.

In FIG. 4A, a dotted line VXB indicates the vertical angle of view of the back camera 80B, and the optical axis AXB of a one-dot chain line indicates the optical axis of the back camera 80B. A dashed line VXaB indicates a vertical angle of view within which distortion is less than or equal to a predetermined value within the vertical angle of view of the back camera 80B.

In FIG. 4B, a dotted line HXB indicates the horizontal angle of view of the back camera 80B, and a dashed line HXaB indicates a horizontal angle of view within which distortion is less than or equal to a predetermined value within the horizontal angle of view of the back camera 80B.

FIG. 5A illustrates an image 41Ba captured by the back camera 80B. FIG. 5B illustrates the back camera image 41B displayed on the image display part 41 of the display device 40.

As illustrated in FIG. 5A, the image 41Ba captured by the back camera 80B includes a counterweight image G11, a right end image G12, a left end image G13, a first traffic cone image G14, a second traffic cone image G15, a stake image G16, and a stake image G17.

An optical axis point M11 is a pixel corresponding to the intersection of the optical axis AXB of the back camera 80B and a feature that is an object of imaging. An ellipse indicated by a dashed line M12 indicates an image area where distortion is less than or equal to a predetermined value, and corresponds to the vertical angle of view indicated by the dashed line VXaB of FIG. 4A and the horizontal angle of view indicated by the dashed line HXaB of FIG. 4B. A rectangle indicated by a two-dot chain line M13 indicates an area to be subjected to trimming or masking.

The optical axis point M11, the dashed line M12, and the two-dot chain line M13 are figures added for explanation and not actually included in the image 41Ba captured by the back camera 80B.

The counterweight image G11 is an image of the back side (−X side) of the upper surface of the counterweight CW. The right end image G12 is an image of the right end (−Y side end) of the counterweight CW. The left end image G13 is an image of the left end (+Y side end) of the counterweight CW. The first traffic cone image G14 is an image of three traffic cones placed on a path that the right crawler 1CR passes through when the shovel PS travels backward. The second traffic cone image G15 is an image of three traffic cones placed on a path that the left crawler 1CL passes through when the shovel PS travels backward. The stake image G16 is an image of a stake P4 driven into the ground. The stake image G17 is an image of a stake P5 driven into the ground. As illustrated in FIGS. 4A and 4B, the stake P4 is set up at a position behind and to the left of the upper swing structure 3. As illustrated in FIGS. 4A and 4B, the stake P5 is set up at a position behind and to the right of the upper swing structure 3. Specifically, the stake P4 and the stake P5 are set up at such positions as not to contact the shovel PS even when the shovel PS travels backward.

The image 41Ba is configured such that the optical axis point M11 is placed closer to the counterweight image G11 than in the case of the back camera image 41B illustrated in FIG. 3B. Specifically, the image 41Ba is configured such that the image area where distortion is less than or equal to a predetermined value (the area surrounded by the dashed line M12 including the optical axis point M11) includes the boundary between a ground image and a central portion of the counterweight image G11. That is, the image 41Ba is configured such that distortion in a part of an edge of the upper surface of the upper swing structure 3 is reduced compared with distortion in another part in the image 41Ba.

The back camera image 41B is generated by performing trimming or masking on the rectangular area surrounded by the two-dot chain line M13 in the image 41Ba captured by the back camera 80B.

According to this configuration, distortion is reduced at and around the boundary between the ground image and the counterweight image G11 more than in the case of the back camera image 41B illustrated in FIG. 3B. Therefore, the operator who looks at the image 41Ba can more intuitively understand the positional relationship between a feature and the shovel PS around the boundary. The positional relationship between a feature and the shovel PS includes, for example, the distance between the feature and the shovel PS. In the back camera image 41B illustrated in FIG. 3B, the back-end edge portion of the upper surface of the counterweight CW (which actually has a shape protruding backward of the upper swing structure 3) is displayed as having a concave shape because of barrel distortion.

Furthermore, the optical axis point M11, which is placed outside (above) the counterweight image G11 according to this example, may be placed inside the counterweight image G11. That is, the back camera 80B may also be attached to the bracket CP such that the optical axis AXB intersects the counterweight CW.

Furthermore, because the right end image G12 and the left end image G13 are displayed, the operator who looks at the image 41Ba can understand the positional relationship between a feature behind the upper swing structure 3 and the shovel PS more easily than in the case where a counterweight image is displayed over the entire width of a camera image, namely, where neither end of the counterweight CW is displayed.

Nonetheless, the operator may wrongly understand that the counterweight CW will contact the stake P4 and the stake P5 when moving the shovel PS backward. This is because the right end image G12 is displayed on the left side of the stake image G17 and the left end image G13 is displayed on the right side of the stake image G16 in the width direction of the image 41Ba.

In contrast, the conversion part 40a of the display device 40 performs trimming or masking on the rectangular area surrounded by the two-dot chain line M13 and thereafter displays a counterweight figure G18 in such a manner that the positional relationship between the machine body width of a shovel and a feature in the back camera image 41B is equal to their actual positional relationship as in the back camera image 41B illustrated in FIG. 5B. According to the example illustrated in FIG. 5B, the conversion part 40a displays the counterweight figure G18 such that the width of the counterweight figure G18 appears to be substantially equal to the interval between the left end of the first traffic cone image G14 and the right end of the second traffic cone image G15. This is because the actual width W1 of the counterweight CW, namely, the width of the crawlers 1C, is substantially equal to the interval between the traffic cones placed on a path that the right crawler 1CR passes through when the shovel PS travels backward and the traffic cones placed on a path that the left crawler 1CL passes through when the shovel PS travels backward. Therefore, the display device 40 can further ensure that the operator of the shovel PS understands that the counterweight CW does not contact the stake P4 and the stake P5 even when the operator of the shovel PS moves the shovel PS backward. This is because the left end of the counterweight figure G18 is displayed on the right side of the stake image G17 and the right end of the counterweight figure G18 is positioned on the left side of the stake image G16 in the width direction of the back camera image 41B. The conversion part 40a of the display device 40 may perform distortion correction at this point. Furthermore, the conversion part 40a does not have to display the counterweight figure G18 such that the positional relationship between the machine body width of a shovel and a feature in the back camera image 41B is exactly equal to their actual positional relationship. For example, the scale of the counterweight figure G18 does not necessarily have to be accurate.

Next, an example of the display of a right camera image 41R is described with reference to FIGS. 4A, 4B, 6A and 6B. The following description may also be applied the same to a left camera image generated based on an image captured by the left camera 80L.

As illustrated in FIGS. 4A and 4B, the right camera 80R is attached to a right safety rail GRR provided on the upper swing structure 3, and the left camera 80L is attached to a left safety rail GRL provided on the upper swing structure 3. The right camera 80R, however, may also be attached to a handrail HR or a mirror stay (not depicted) provided on the upper swing structure 3 to the extent that the right camera 80R is installed at a predetermined height. For example, the right camera 80R may be provided on a lateral member SB that is a reinforcing plate member of the right safety rail GRR or may be provided at the top of a handrail member PM that is a pipe member of the right safety rail GRR. The right camera 80R may alternatively be provided on the handrail member PM at a position higher than the lateral member SB. The same is true for the left camera 80L. Desirably, the back camera 80B, the left camera 80L, and the right camera 80R are attached in such a manner as to be substantially equal in installation height.

In FIG. 4A, a dotted line HXR indicates the horizontal angle of view of the right camera 80R, and the optical axis AXR of a one-dot chain line indicates the optical axis of the right camera 80R. A dashed line HXaR indicates a horizontal angle of view within which distortion is less than or equal to a predetermined value within the horizontal angle of view of the right camera 80R. The horizontal angle of view of the left camera 80L and a horizontal angle of view within which distortion is less than or equal to a predetermined value within the horizontal angle of view, which are not visible in FIG. 4A, are the same as those of the right camera 80R.

Furthermore, in FIG. 4B, a dotted line VXR indicates the vertical angle of view of the right camera 80R, and a dashed line VXaR indicates a vertical angle of view within which distortion is less than or equal to a predetermined value within the vertical angle of view of the right camera 80R. The optical axis AXL of a one-dot chain line indicates the optical axis of the left camera 80L, a dotted line VXL indicates the vertical angle of view of the left camera 80L, and a dashed line VXaL indicates a vertical angle of view within which distortion is less than or equal to a predetermined value within the vertical angle of view of the left camera 80L.

Figure 6A:
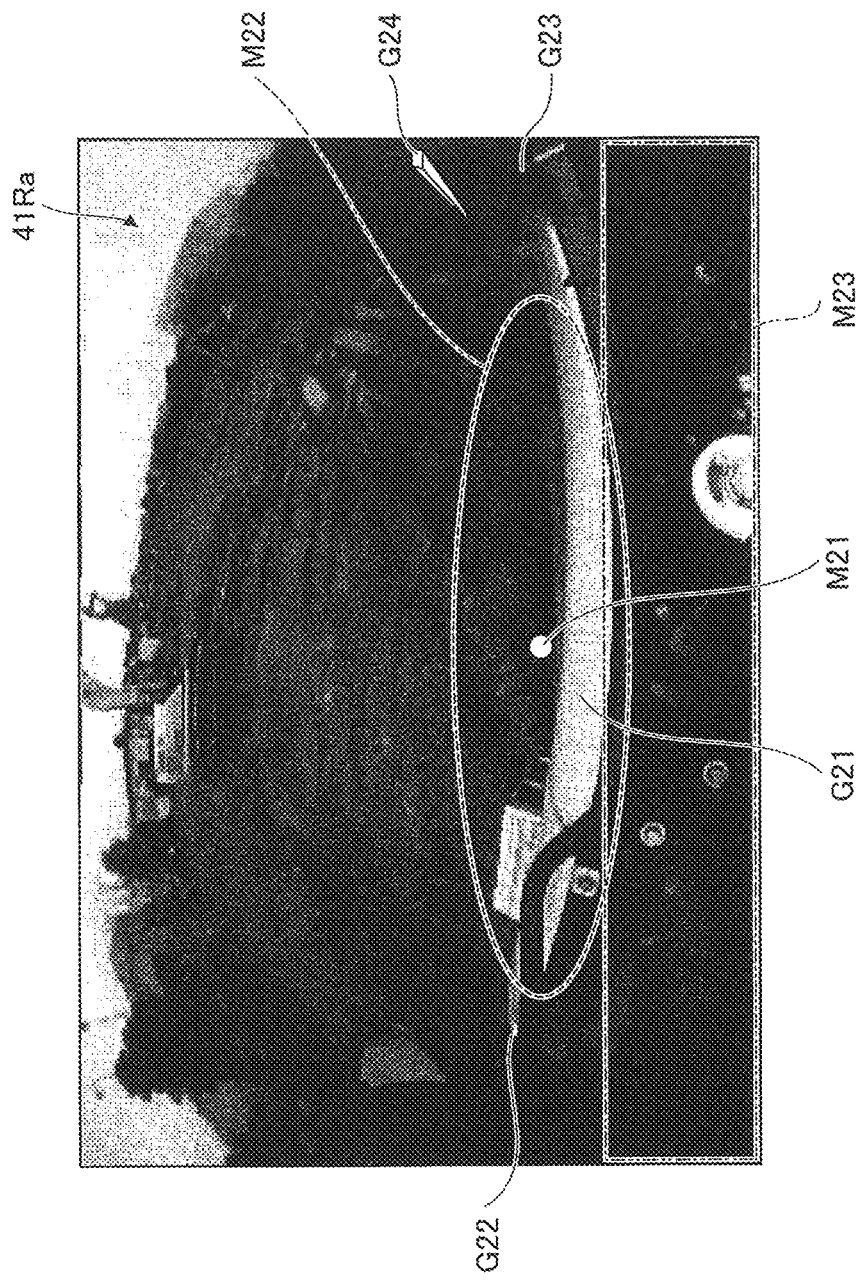
FIG. 6A illustrates an example of an image captured by a right camera.
Figure 6B:
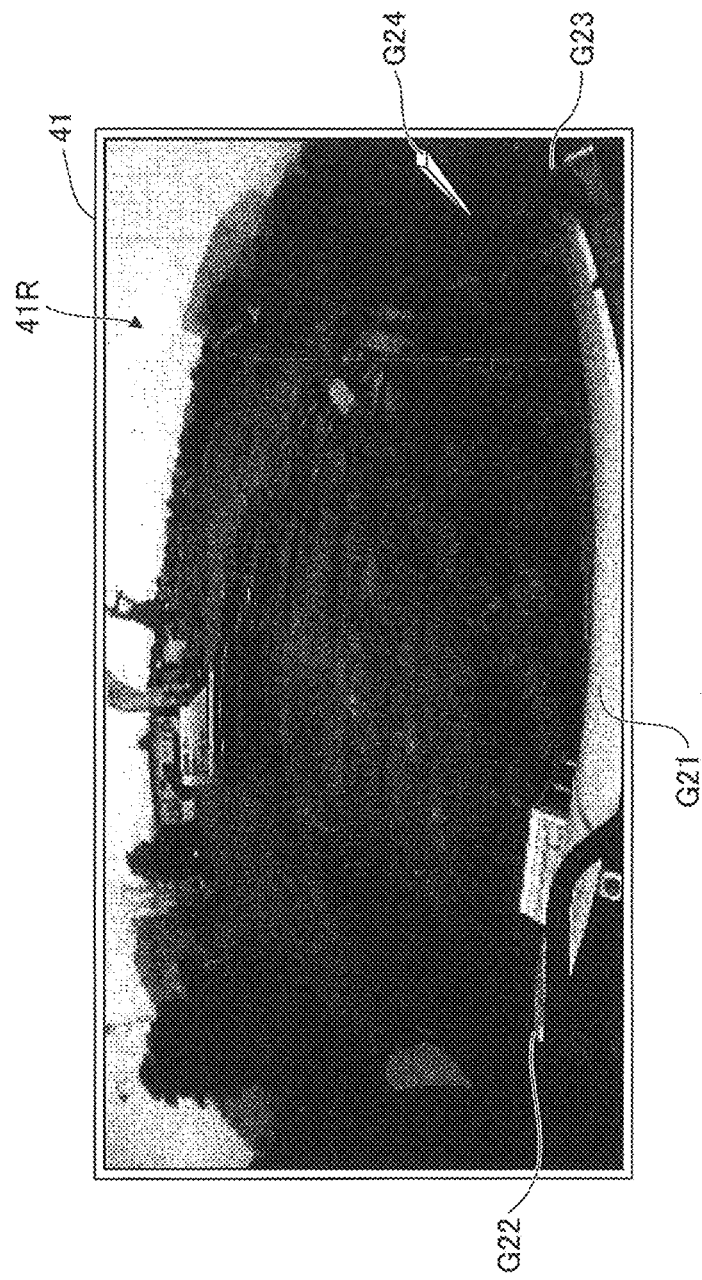
FIG. 6B illustrates an example of the display of a right camera image.

FIG. 6A illustrates an image 41Ra captured by the right camera 80R. FIG. 6B illustrates the right camera image 41R displayed on the image display part 41 of the display device 40.

As illustrated in FIG. 6A, the image 41Ra captured by the right camera 80R includes a right side panel image G21, a front end image G22, a back end image G23, and a stake image G24.

An optical axis point M21 is a pixel corresponding to the intersection of the optical axis AXR of the right camera 80R and a feature that is an object of imaging. An ellipse indicated by a dashed line M22 indicates an image area where distortion is less than or equal to a predetermined value, and corresponds to the horizontal angle of view indicated by the dashed line HXaR of FIG. 4A and the vertical angle of view indicated by the dashed line VXaR of FIG. 4B. A rectangle indicated by a two-dot chain line M23 indicates an area to be subjected to trimming or masking.

The optical axis point M21, the dashed line M22, and the two-dot chain line M23 are figures added for explanation and not actually included in the image 41Ra captured by the right camera 80R.

The right side panel image G21 is an image of a right side panel SPR. The front end image G22 is an image of the right front end of the upper swing structure 3. The back end image G23 is an image of the right back end of the upper swing structure 3. The stake image G24 is an image of the stake P5 driven into the ground. As illustrated in FIGS. 4A and 4B, the stake P5 is set up at a position behind and to the right of the upper swing structure 3. Specifically, the stake P5 is set up at such a position as not to contact the shovel PS even when the shovel PS (the upper swing structure 3) moves rightward, namely, the lower traveling structure 1 moves forward or backward, with the longitudinal axis of the lower traveling structure 1 and the longitudinal axis of the upper swing structure 3 being perpendicular to each other.

The image 41Ra is configured such that the optical axis point M21 is placed close to the right side panel image G21 the same as in the case of the image 41Ba illustrated in FIG. 5A. Specifically, the image 41Ra is configured such that the image area where distortion is less than or equal to a predetermined value (the area surrounded by the dashed line M22 including the optical axis point M21) includes the boundary between a ground image and a central portion of the right side panel image G21. That is, the image 41Ra is configured such that distortion in a part of an edge of the upper surface of the upper swing structure 3 is reduced compared with distortion in another part in the image 41Ra.

The right camera image 41R is generated by performing trimming or masking on the rectangular area surrounded by the two-dot chain line M23 in the image 41Ra captured by the right camera 80R.

According to this configuration, distortion is reduced at and around the boundary between the ground image and the right side panel image G21 the same as in the case of the boundary illustrated in FIG. 5A. Therefore, the operator who looks at the right camera image 41R can more intuitively understand the positional relationship between a feature and the shovel PS around the boundary.

Furthermore, the optical axis point M21, which is placed outside (above) the right side panel image G21 according to this example, may be placed inside the right side panel image G21. That is, the right camera 80R may also be attached to the right safety rail GRR such that the optical axis AXR intersects the right side panel SPR.

Furthermore, because the front end image G22 that can be captured by the right camera 80R attached at a relatively high position is displayed in the right camera image 41R, the operator who looks at the right camera image 41R can easily understand the positional relationship between a feature to the right of or in front of and to the right of the upper swing structure 3 and the shovel PS. Likewise, because the back end image G23 that can be captured by the right camera 80R attached at a relatively high position is displayed in the right camera image 41R, the operator who looks at the right camera image 41R can easily understand the positional relationship between a feature to the right of or behind and to the right of the upper swing structure 3 and the shovel PS.

Furthermore, because the front end image G22 and the back end image G23 are displayed in the right camera image 41R, the operator who looks at the right camera image 41R can understand the positional relationship between a feature to the right of the upper swing structure 3 and the shovel PS more easily than in the case where a right side panel image is displayed over the entire width of a camera image, namely, where the front end and the back end of the upper swing structure 3 are not displayed.

Figure 7:
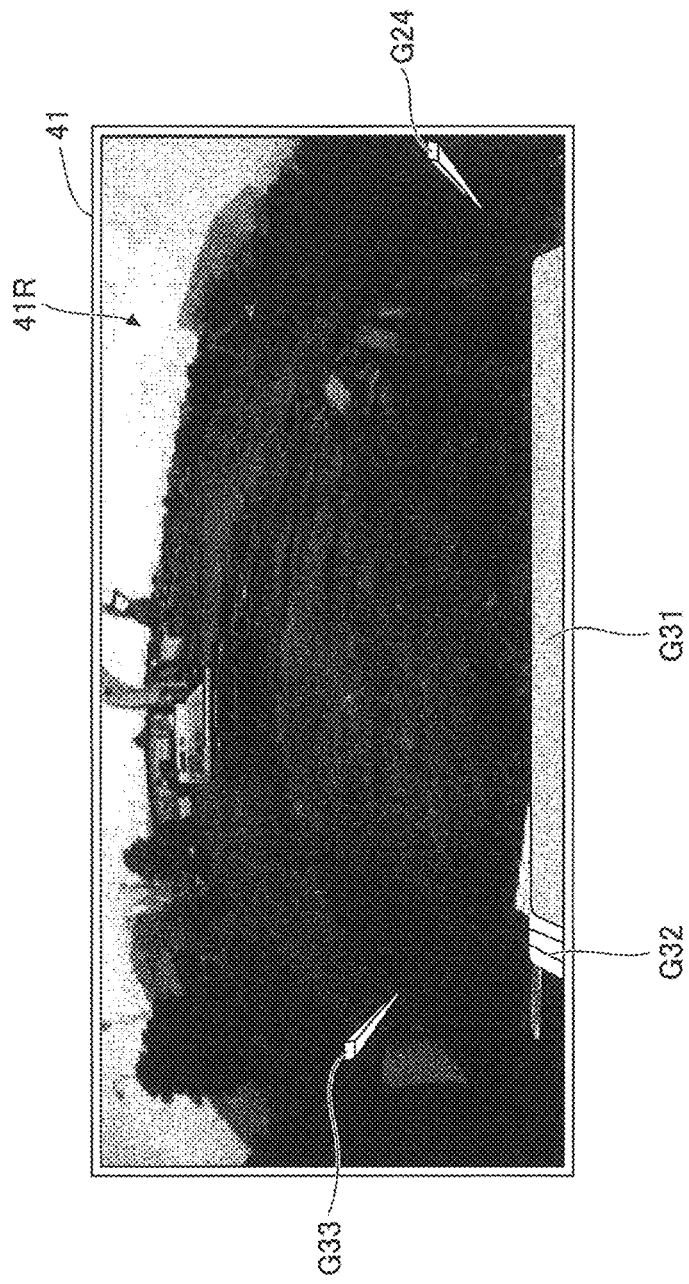
FIG. 7 illustrates another example of the display of the right camera image.

Next, another example of the display of the right camera image 41R is described with reference to FIG. 7. The right camera image 41R of FIG. 7 is different from the right camera image 41R of FIG. 6B in including an upper swing structure figure G31 and a step figure G32 in place of the front end image G22 and the back end image G23. Furthermore, the right camera image 41R of FIG. 7 is different from the right camera image 41R of FIG. 6B in including another stake image G33. Otherwise, the right camera image 41R of FIG. 7 is equal to the right camera image 41R of FIG. 6B. Therefore, a description of the same portion is omitted, and differences are described in detail.

The upper swing structure figure G31 is a figure that indicates a length L1 of the upper swing structure 3 (see FIG. 3A). According to the example of FIG. 7, the upper swing structure figure G31 is a substantially rectangular computer-generated graphic (figure) having a length that is the length L1 of the upper swing structure 3 projected onto a predetermined virtual plane (for example, a virtual plane corresponding to the ground on which the shovel PS is positioned), and is superimposed and displayed over a right side panel image.

The step figure G32 is a figure indicating a length L2 of a step ST installed in the right front of the upper swing structure 3 (see FIG. 3A). According to the example of FIG. 7, like the upper swing structure figure G31, the step figure G32 is a substantially rectangular computer-generated graphic (figure) having a length that is the length L2 of the step SST projected onto a predetermined virtual plane (for example, a virtual plane corresponding to the ground on which the shovel PS is positioned), and is superimposed and displayed over the right side panel image.

Specifically, the conversion part 40a of the display device 40 performs trimming or masking on the rectangular area surrounded by the two-dot chain line M23 in FIG. 6A and thereafter displays the upper swing structure figure G31 and the step figure G32 over the right side panel image G21 such that the positional relationship between the machine body length of a shovel and a feature in the right camera image 41R is equal to their actual positional relationship.

The stake image G33 is an image of an undepicted stake P6 that is set up at a position in front of and to the right of the upper swing structure 3. Specifically, the stake P6 is set up at such a position as not to contact the shovel PS even when the shovel PS (the upper swing structure 3) moves rightward, namely, the lower traveling structure 1 moves forward or backward, with the longitudinal axis of the lower traveling structure 1 and the longitudinal axis of the upper swing structure 3 being perpendicular to each other.

The operator who looks at the right camera image 41R of FIG. 6B may wrongly understand that the right back end of the upper swing structure 3 will contact the stake P5 when moving the upper swing structure 3 rightward with the longitudinal axis of the lower traveling structure 1 and the longitudinal axis of the upper swing structure 3 being perpendicular to each other. This is because the back end image G23 is positioned on the right side of the stake image G24 in the width direction of the right camera image 41R.

In contrast, the right camera image 41R of FIG. 7 can further ensure that the operator of the shovel PS understands that the right back end of the upper swing structure 3 does not contact the stake P5. This is because the right end of the upper swing structure figure G31 is positioned on the left side of the stake image G24 in the width direction of the right camera image 41R. Likewise, the right camera image 41R of FIG. 7 can further ensure that the operator of the shovel PS understands that the step ST does not contact the stake P6. This is because the left end of the step figure G32 is positioned on the right side of the stake image G33 in the width direction of the right camera image 41R.

Thus, according to the example illustrated in FIG. 7, the conversion part 40a superimposes and displays the upper swing structure figure G31 and the step figure G32 such that the interval between the right end of the upper swing structure figure G31 and the left end of the step figure G32 appears to be smaller than the interval between the stake image G24 and the stake image G33. This is because the total of the actual length L1 of the upper swing structure 3 (see FIG. 3A) and the actual length L2 of the step ST (see FIG. 3A) is smaller than the interval between the stake P5 and the stake P6. The conversion part 40a, however, does not have to display the upper swing structure figure G31 and the step figure G32 such that the positional relationship between the machine body width of a shovel and a feature in the right camera image 41R is exactly equal to their actual positional relationship. For example, the scale of at least one of the upper swing structure figure G31 and the step figure G32 does not necessarily have to be accurate.

Figure 8:
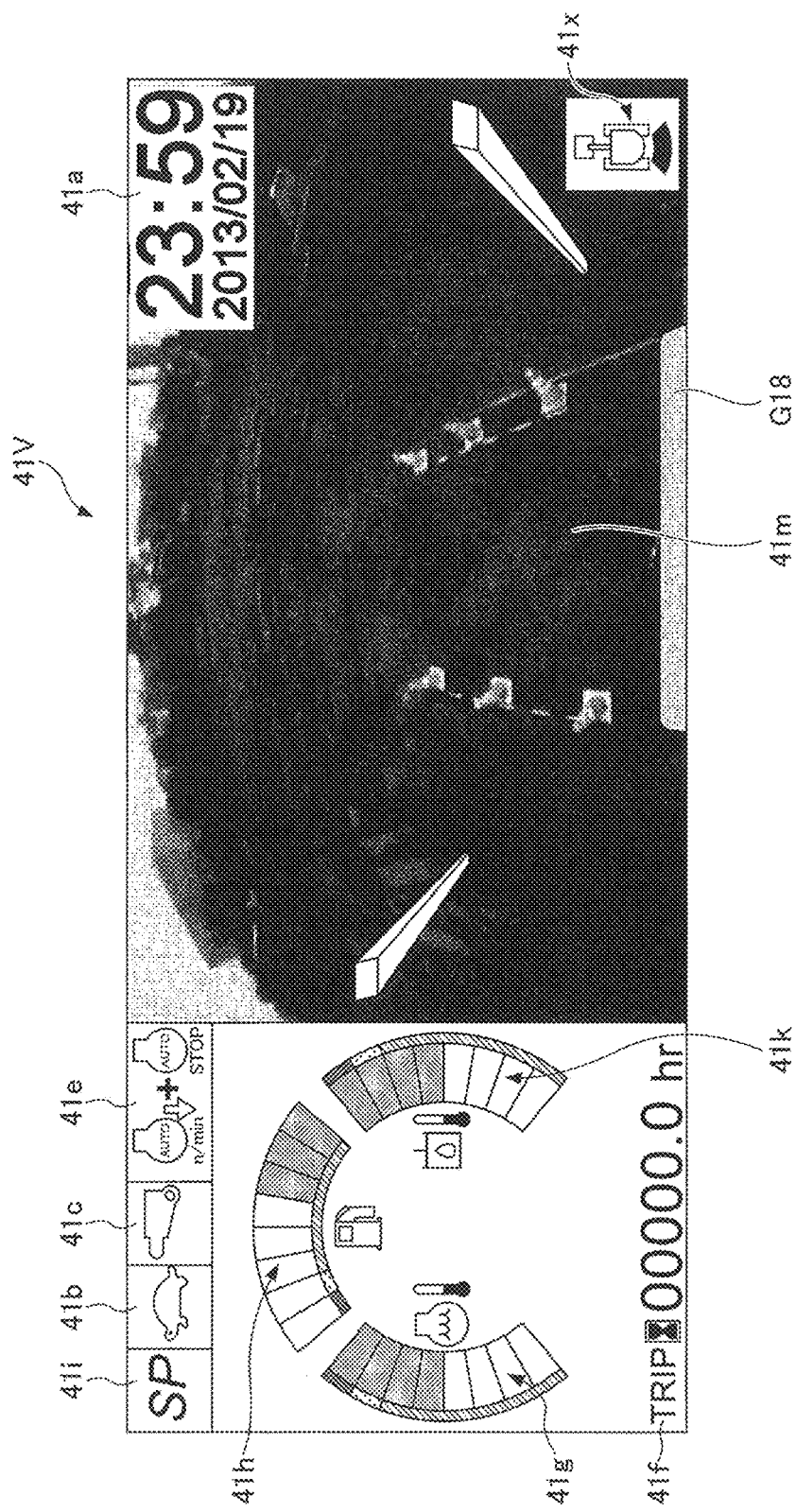
FIG. 8 illustrates an example configuration of a main screen.

Next, an example configuration of a main screen 41V displayed on the display device 40 is described with reference to FIG. 8. The main screen 41V of FIG. 8 is displayed on the image display part 41 while the shovel PS is in operation, for example.

The main screen 41V includes a date and time display area 41a, a travel mode display area 41b, an attachment display area 41c, an engine control status display area 41e, an engine operating time display area 41f, a coolant water temperature display area 41g, a remaining fuel amount display area 41h, a rotational speed mode display area 41i, a hydraulic oil temperature display area 41k, a camera image display area 41m, and an orientation indicator icon 41x.

The travel mode display area 41b, the attachment display area 41c, the engine control status display area 41e, and the rotational speed mode display area 41i are areas for displaying settings information that is information on the settings of the shovel PS. The engine operating time display area 41f, the coolant water temperature display area 41g, the remaining fuel amount display area 41h, and the hydraulic oil temperature display area 41k are areas for displaying operating state information that is information on the operating state of the shovel PS.

Specifically, the date and time display area 41a is an area for displaying a current date and time. The travel mode display area 41b is an area for displaying a current travel mode. The attachment display area 41c is an area for displaying an image that represents a currently attached end attachment. FIG. 8 illustrates that an image representing a rock drill is displayed.

The engine control status display area 41e is an area for displaying the control status of the engine 11. The engine operating time display area 41f is an area for displaying the cumulative operating time of the engine 11. The coolant water temperature display area 41g is an area for displaying the current temperature condition of engine coolant water. The remaining fuel amount display area 41h is an area for displaying the state of the amount of remaining fuel stored in a fuel tank. The rotational speed mode display area 41i is an area for displaying a current rotational speed mode set with the engine rotational speed adjustment dial 75. The hydraulic oil temperature display area 41k is an area for displaying the state of the temperature of hydraulic oil in the hydraulic oil tank.

The camera image display area 41m is an area for displaying an image captured by the image capturing device 80. According to the example of FIG. 8, a back camera image generated based on an image captured by the back camera 80B is displayed in the camera image display area 41m. This back camera image is, for example, the back camera image 41B illustrated in FIG. 5B and includes the counterweight figure G18.

The orientation indicator icon 41x is an icon representing the relative positional relationship between the orientation of the image capturing device 80 that has captured a captured image displayed on a display screen and the orientation of the upper swing structure 3. According to the example of FIG. 8, the orientation indicator icon 41x showing that a camera that has captured a camera image displayed in the camera image display area 41m is the back camera 80B is displayed in the lower right corner of the camera image display area 41m. The orientation indicator icon 41x may also be displayed at a position other than the lower right corner, such as the lower center, the lower left corner, the upper right corner, or the upper left corner of the camera image display area 41m, or may also be displayed outside the camera image display area 41m.

The display device 40 may also display another camera image such as the back camera image 41B as illustrated in FIG. 3B or the right camera image 41R as illustrated in FIG. 6B or 7 in the camera image display area 41m.

As described above, the shovel PS according to an embodiment of the present invention includes the lower traveling structure 1, the upper swing structure 3 mounted on the lower traveling structure 1 via the swing mechanism 2, the image capturing device 80 attached to the upper swing structure 3 to capture an image of an area surrounding the upper swing structure 3, and the display device 40 configured to display an image captured by the image capturing device 80. The display device 40 is configured to display the image captured by the image capturing device 80 such that distortion in a part of an edge of the upper surface of the upper swing structure 3 is reduced compared with distortion in another part in the image. The image capturing device 80 may be attached above the upper swing structure 3 such that the optical axis passes through an area near the edge of the upper surface of the upper swing structure 3. In this case, the angle between the optical axis passing through an area near the edge of the upper surface of the upper swing structure 3 and an optical axis passing through the edge of the upper surface of the upper swing structure 3 is less than or equal to a predetermined angle. In other words, the distance between the optical axis passing through an area near the edge of the upper surface of the upper swing structure 3 and an optical axis passing through the edge of the upper surface of the upper swing structure 3 in a virtual horizontal plane including the upper surface of the upper swing structure 3 is less than or equal to a predetermined distance.

The image capturing device 80 includes, for example, the back camera 80B, the left camera 80L, and the right camera 80R. In this case, for example, as illustrated in FIGS. 4A and 4B, the back camera 80B may be attached to the bracket CP installed above the upper swing structure 3 such that the optical axis AXB passes through an area near the back side edge of the upper surface of the upper swing structure 3. The left camera 80L may be attached to the left safety rail GRL installed above the upper swing structure 3 such that the optical axis AXL passes through an area near the left side edge of the upper surface of the upper swing structure 3. The right camera 80R may be attached to the right safety rail GRR installed above the upper swing structure 3 such that the optical axis AXR passes through an area near the right side edge of the upper surface of the upper swing structure 3.

According to this configuration, the shovel PS can make it easier for the operator to understand the relationship between a feature in an area around the shovel PS and the width of the shovel PS (including the front-back width and the left-right width of the shovel PS). Therefore, the operator can understand the surroundings of the shovel PS with more accuracy. As a result, the shovel PS can improve the working environment of the operator. For example, in the case of moving the shovel PS positioned on the ground (for example, the ground including a slope top) located higher than a slope backward during slope finishing work, the operator of the shovel PS can accurately understand the positional relationship between a path through which the crawlers 1C pass and the slope top by looking at the back camera image 41B. Therefore, the shovel PS can prevent the operator from being more careful than is necessary with respect to the backward travel of the shovel PS. As a result, the shovel PS can prevent a decrease in work efficiency.

Furthermore, the shovel PS according to another embodiment of the present invention includes the lower traveling structure 1, the upper swing structure 3 mounted on the lower traveling structure 1 via the swing mechanism 2, the cab 10 mounted on the upper swing structure 3, the display device 40 provided in the cab 10, and the image capturing device 80 attached to the upper swing structure 3 to capture an image of an area surrounding the upper swing structure 3. The display device 40 is configured to display a figure that represents the width of the upper swing structure 3 at a position where an image of an edge of the upper surface of the upper swing structure 3 is displayed or in its vicinity in the image captured by the image capturing device 80.

For example, as illustrated in FIGS. 3A and 3B, the display device 40 may be configured to display the counterweight figure G5, which is a figure representing the width of the upper swing structure 3, at a position where the counterweight image G3, which is an image of the back side edge of the upper swing structure 3, is displayed or in its vicinity in the back camera image 41B captured by the back camera 80B.

For example, the display device 40 may also be configured to display the counterweight figure G18, which is a figure representing the width of the upper swing structure 3, at a position where the counterweight image G11, which is an image of the back side edge of the upper surface of the upper swing structure 3, is displayed or in its vicinity in the image 41Ba captured by the back camera 80B as illustrated in FIGS. 5A and 5B.

For example, the display device 40 may also be configured to display the upper swing structure figure G31, which is a figure representing the front-back width of the upper swing structure 3, and the step figure G32 at a position where the right side panel image G21, which is an image of the right side edge of the upper surface of the upper swing structure 3, is displayed or in its vicinity in the image 41Ra captured by the right camera 80R (see FIG. 6A) as illustrated in FIG. 7.

The image capturing device 80 is attached above the upper swing structure 3 such that an image captured by the image capturing device 80 desirably includes an image of each end of the edge of the upper surface of the upper swing structure 3. For example, the back camera 80B may be attached to the bracket CP installed on top of the counterweight CW such that the image 41Ba captured by the back camera 80B includes the right end image G12 and the left end image G13, which are images of both ends of the back side edge of the upper surface of the counterweight CW, as illustrated in FIG. 5A. Furthermore, the right camera 80R may be attached to the right safety rail GRR installed on the upper swing structure 3 such that the image 41Ra captured by the right camera 80R includes the front end image G22 and the back end image G23, which are images of both ends of the right side edge of the upper swing structure 3, as illustrated in FIG. 6A.

Of an image of the upper surface of the upper swing structure 3, a part other than a part of the edge may be trimmed or masked in order to make an image of a part that needs monitoring as easy to see as possible.

Figure 9:
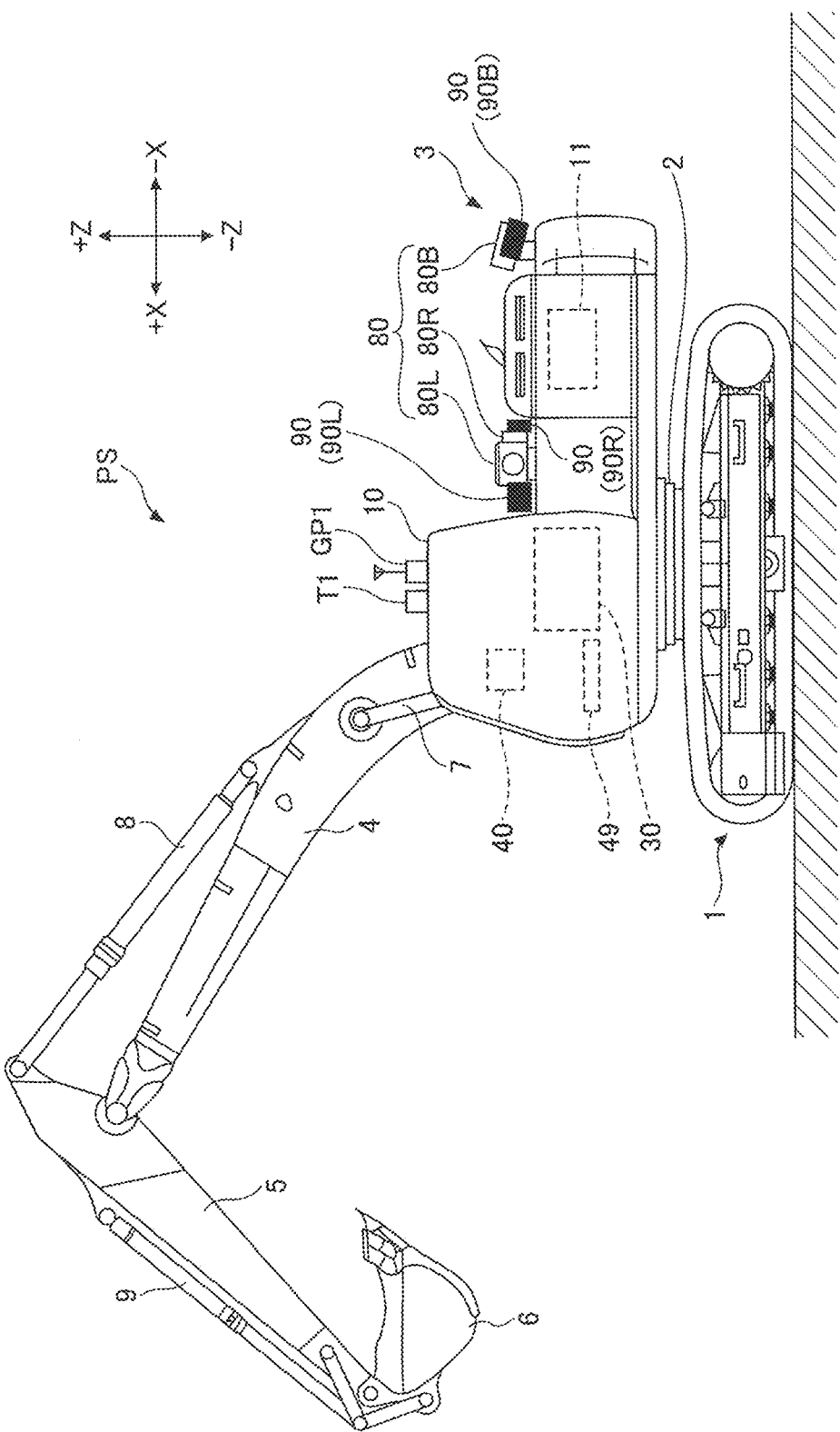
FIG. 9 is a side view of the shovel according to another embodiment of the present invention.

The shovel PS may also be configured to be able to detect an object in an area surrounding the shovel PS. FIG. 9 is a side view of the shovel PS, illustrating another example configuration of the shovel PS. The shovel PS illustrated in FIG. 9 is different in including an object detector 90 from, but otherwise equal to, the shovel PS illustrated in FIG. 1. Therefore, a description of a common portion is omitted, and differences are described in detail.

The shovel PS illustrated in FIG. 9 is configured to be able to detect an object using at least one of the image capturing device 80 and the object detector 90.

The object detector 90 includes a back sensor 90B that monitors a space behind the shovel PS, a left sensor 90L that monitors a space to the left of the shovel PS, and a right sensor 90R that monitors a space to the right of the shovel PS. The object detector 90 may also include a front sensor that monitors a space in front of the shovel PS. Each of the back sensor 90B, the left sensor 90L, and the right sensor 90R is, for example, a LIDAR, a millimeter wave radar, a stereo camera, or the like.

In the case of detecting an object using the output of the image capturing device 80, the controller 30, for example, performs various kinds of image processing on an image captured by the image capturing device 80 and thereafter detects an object using known image recognition techniques. The image capturing device 80 may include a front camera that captures an image of a space in front of the shovel PS.

The shovel PS may display information on an object detected by at least one of the image capturing device 80 and the object detector 90 on the display device 40. Specifically, when an object is detected by at least one of the image capturing device 80 and the object detector 90, the shovel PS may display an image that makes it possible to identify the detected object at a position corresponding to the actual position of the detected object in a displayed image.

For example, when a person is detected behind the shovel PS, the shovel PS may superimpose and display a particular image (a frame, an icon, or the like) over a position corresponding to the actual position of the detected person in the back camera image 41B. The shovel PS may change the form of display of the particular image according to the positional relationship between the shovel PS and the person. For example, the shovel PS may change at least one of the color and the shading of the particular image according to the distance between the shovel PS and the person. The same is true for the case where a person is detected on the side of the shovel PS.

Figure 10:
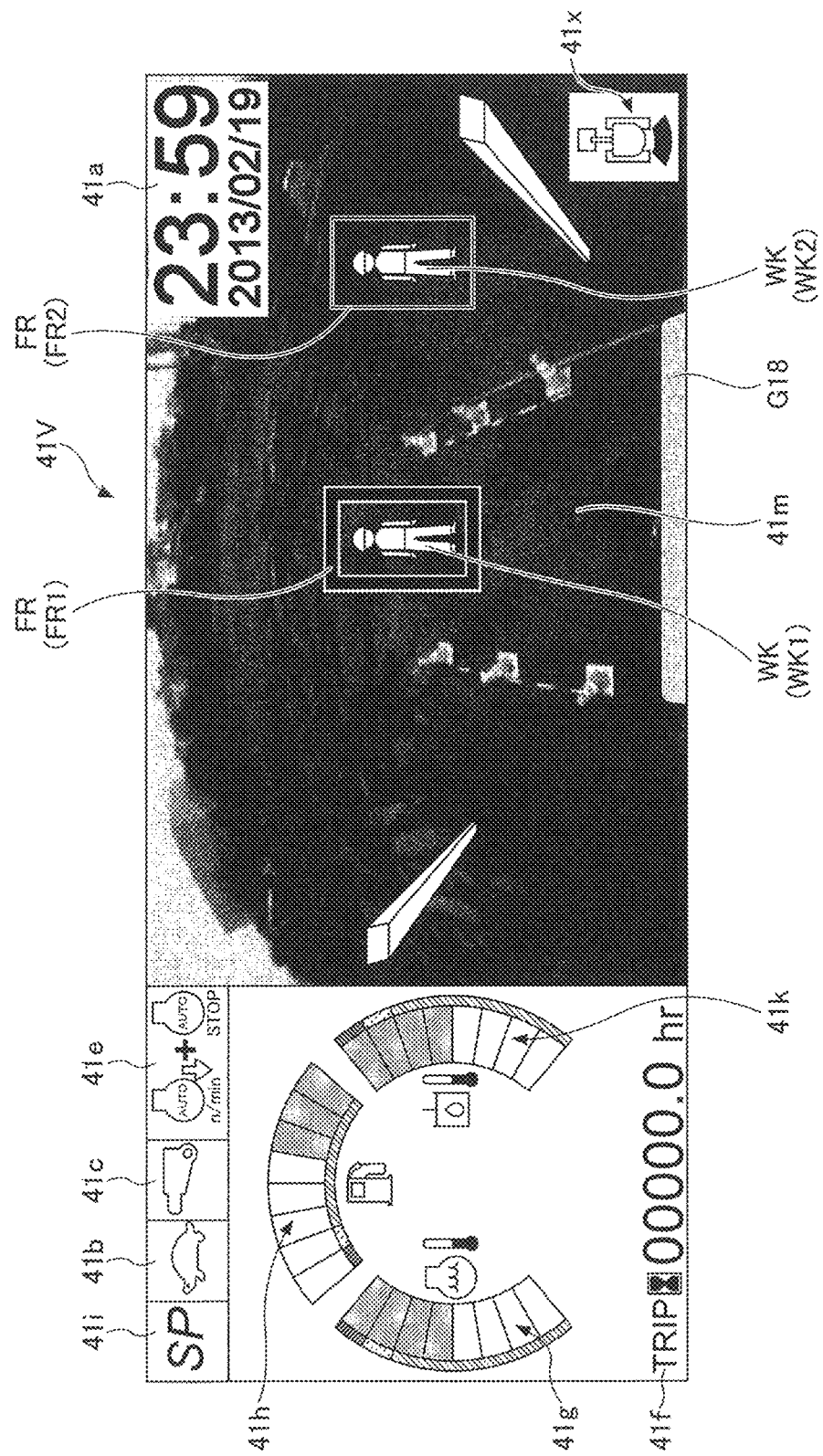
FIG. 10 illustrates another example configuration of the main screen.

FIG. 10 illustrates an example configuration of the main screen 41V displayed on the image display part 41 when the image capturing device 80 detects a person behind the shovel PS, and corresponds to FIG. 8.

The main screen 41V of FIG. 10 is different in that an image WK of a person is displayed and a frame image FR surrounding the image WK is displayed in the back camera image 41B from, but otherwise equal to, the main screen 41V of FIG. 8.

According to the example illustrated in FIG. 10, the shovel PS detects two workers working behind. Therefore, an image WK1 of one of the two workers, a frame image FR1 surrounding the image WK1, an image WK2 of the other of the two workers, and a frame image FR2 surrounding the image WK2 are displayed in the back camera image 41B.

Specifically, according to the example illustrated in FIG. 10, the shovel PS is configured to change the thickness of the frame image FR based on whether the position of a detected person is included in the path range of the lower traveling structure 1. The path range of the lower traveling structure 1 means, for example, a range including a path that the right crawler 1CR passes through and a path that the left crawler passes through when the lower traveling structure 1 is caused to travel straight forward or backward and an area between them. According to the example illustrated in FIG. 10, the shovel PS determines that the position of one of the two workers is included in the path range of the lower traveling structure 1 and that the position of the other of the two workers is not included in the path range of the lower traveling structure 1. Therefore, the shovel PS causes the frame image FR1 surrounding the image WK1 to be thicker than the frame image FR2 surrounding the image WK2.

The shovel PS may also be configured to change the color of the frame image FR based on whether the position of a detected person is included in the path range of the lower traveling structure 1.

The operator who looks at this main screen 41V can intuitively understand that the shovel PS may contact one of the two workers when moving the shovel PS straight backward.

The shovel PS may also superimpose and display a path figure that is a figure representing a path through which the crawlers 1C pass when the shovel PS is caused to travel straight forward or backward over the back camera image 41B. The same is true for a right camera image and a left camera image.

Figure 11:
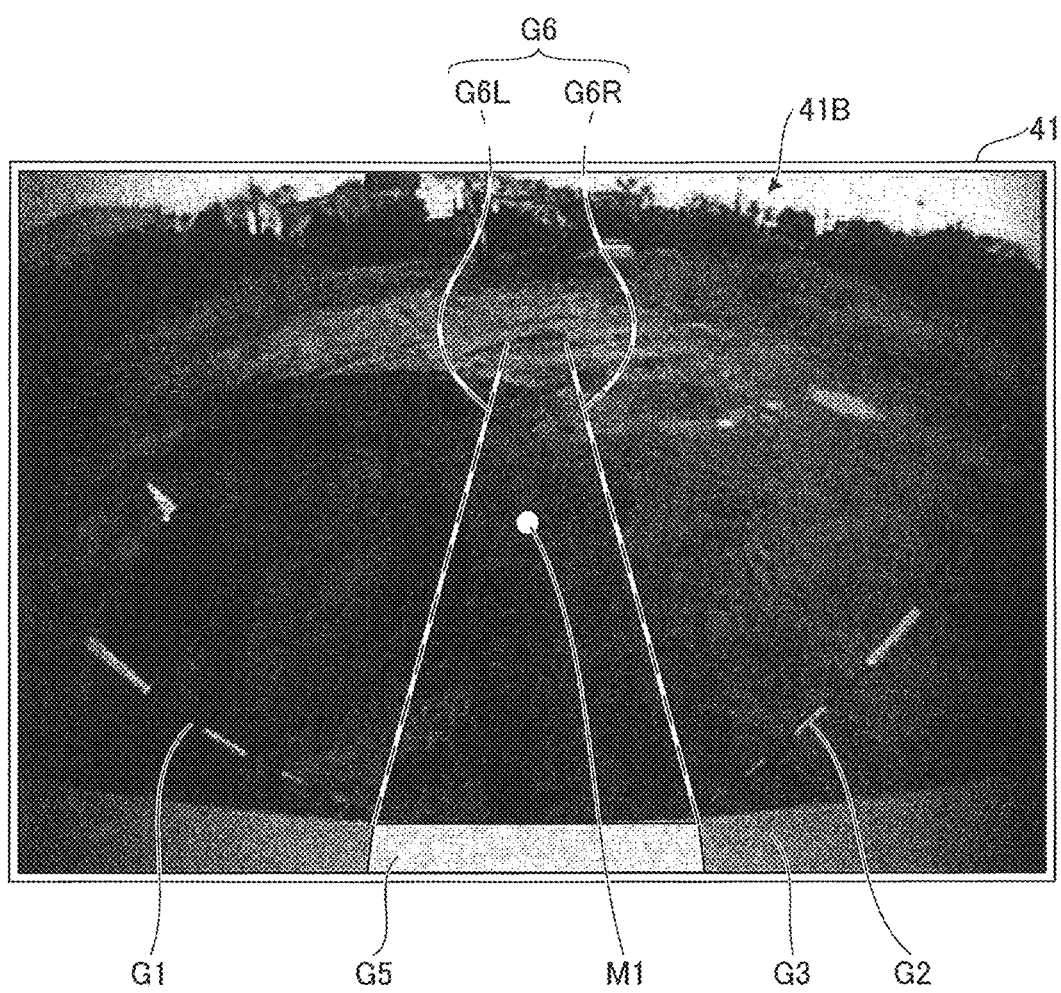
FIG. 11 illustrates another example of the display of the back camera image.

FIG. 11 illustrates an example of the display of the back camera image 41B over which a path figure G6 is superimposed and displayed, and corresponds to FIG. 3B.

According to the example illustrated in FIG. 11, the path figure G6 includes a line segment G6L representing the left end of a path through which the left crawler 1CL passes when the shovel PS is caused to travel straight forward or backward and a line segment G6R representing the right end of a path through which the right crawler 1CR passes when the shovel PS is caused to travel straight forward or backward.

The operator who looks at the back camera image 41B over which the path figure G6 is superimposed and displayed can intuitively understand a line on which the left end of the left crawler 1CL passes and a line on which the right end of the right crawler 1CR passes when the shovel PS is caused to travel straight backward.

Embodiments of the present invention are described in detail above. The present invention, however, is not limited to the above-described embodiments. Various variations, substitutions, etc., may be applied to the above-described embodiments without departing from the scope of the present invention. Furthermore, the individual features described with reference to the above-described embodiments may be suitably combined to the extent that no technical contradiction is caused.

What is claimed is:

1. A shovel comprising:
a lower traveling structure;
an upper swing structure mounted on the lower traveling structure via a swing mechanism;
an image capturing device attached to the upper swing structure to capture an image of an area surrounding the upper swing structure; and
a display device configured to display the image captured by the image capturing device such that distortion in a part of an edge of an upper surface of the upper swing structure is reduced compared with distortion in another part in the image.

2. The shovel as claimed in claim 1, wherein the image capturing device is attached to an upper part of the upper swing structure such that the image captured by the image capturing device includes an image of each of ends of the edge of the upper surface of the upper swing structure.

3. The shovel as claimed in claim 1, wherein of an image of the upper surface of the upper swing structure, a part other than a part of the edge is trimmed or masked.

4. The shovel as claimed in claim 1, wherein
the image capturing device includes a back camera, and
the back camera is installed at a position of a predetermined height from an upper surface of a counterweight such that an image captured by the back camera includes an image of a left end a right end of the counterweight.

5. The shovel as claimed in claim 1, wherein
the image capturing device includes a side camera, and
the side camera is attached to a handrail or a safety rail provided on the upper swing structure such that an image captured by the side camera includes an image of a front end and a back end of the upper swing structure.

6. The shovel as claimed in claim 1, wherein an optical axis of the image capturing device passes through an area near the edge of the upper surface of the upper swing structure.

7. A shovel comprising:
a lower traveling structure;
an upper swing structure mounted on the lower traveling structure via a swing mechanism;
a cab mounted on the upper swing structure;
a display device provided in the cab; and
an image capturing device attached to the upper swing structure to capture an image of an area surrounding the upper swing structure, the area including a feature,
wherein the display device is configured to display a figure that represents a width of the upper swing structure at a display position of an image of an edge of an upper surface of the upper swing structure in the image captured by the image capturing device, the figure matching an actual positional relationship between the upper swing structure and the feature in a direction of the width of the upper swing structure.

8. The shovel as claimed in claim 7, wherein a width of the figure corresponds to a width of an area where the upper swing structure is free of contact with the feature as the lower traveling structure travels in the area surrounding the upper swing structure.

9. The shovel as claimed in claim 7, wherein the display device is configured to display the image captured by the image capturing device such that a size of the figure is smaller than a size of the image of the edge of the upper surface of the upper swing structure in a direction of the width of the upper swing structure.

10. The shovel as claimed in claim 1, wherein the image capturing device is attached to the upper swing structure such that the part includes a boundary between a ground image and a central portion of a counterweight image in the image captured by the image capturing device.

11. The shovel as claimed, in claim 1, wherein the display device is configured to display the image captured by the image capturing device such that an optical axis point of the image capturing device is positioned near a counterweight image.

12. The shovel as claimed, in claim 1, wherein the image capturing device is a camera or a stereo camera.

\* \* \* \* \*